United States Patent
Klein

(10) Patent No.: US 11,323,540 B1
(45) Date of Patent: May 3, 2022

(54) MITIGATING NETWORK RESOURCE CONTENTION

(71) Applicant: Hopin Ltd, London (GB)

(72) Inventor: Nicolas Klein, London (GB)

(73) Assignee: Hopin Ltd, London (GB)

(*) Notice: Subject to any disclaimer, the term of this patent is extended or adjusted under 35 U.S.C. 154(b) by 0 days.

(21) Appl. No.: 17/495,381

(22) Filed: Oct. 6, 2021

(51) Int. Cl.
| | |
|---|---|
| H04L 29/08 | (2006.01) |
| G06F 16/27 | (2019.01) |
| H04L 29/06 | (2006.01) |
| G06F 16/957 | (2019.01) |
| H04L 12/853 | (2013.01) |
| H04L 67/60 | (2022.01) |
| H04L 65/00 | (2022.01) |
| H04L 65/403 | (2022.01) |
| H04L 47/2416 | (2022.01) |

(52) U.S. Cl.
CPC .......... H04L 67/32 (2013.01); G06F 16/27 (2019.01); *G06F 16/9574* (2019.01); *G06F 2212/6028* (2013.01); *H04L 29/06176* (2013.01); *H04L 47/2416* (2013.01); *H04L 65/403* (2013.01)

(58) Field of Classification Search
CPC .......... G06F 9/30047; G06F 12/0811; G06F 2212/60; G06F 2212/602; G06F 2212/6022; G06F 2212/6028; G06F 16/957; G06F 16/9574; G06F 16/27; H04L 12/1813; H04L 12/1818; H04L 29/0881; H04L 29/06176; H04L 47/2416; H04L 65/403; H04L 65/607; H04L 67/32
See application file for complete search history.

(56) References Cited

U.S. PATENT DOCUMENTS 10,592,578 B1 * 3/2020 Mokashi ............. H04L 67/2847
2021/0194988 A1 * 6/2021 Chaysinh ............. H04L 67/325

FOREIGN PATENT DOCUMENTS

WO    WO 2018196541 A1 * 11/2018

OTHER PUBLICATIONS

EA Help. "How to pre-load your games", https://help.ea.com/en/help/origin/origin/origin-pre-load-faq/. (Year: 2019).*

(Continued)

*Primary Examiner* — John M MacIlwinen
(74) *Attorney, Agent, or Firm* — Erise IP, P.A.

(57) ABSTRACT

Media, methods, and systems are disclosed for mitigating network resource contention. Event scheduling details are received regarding one or more virtual events. In response to determining that an upcoming virtual event will begin within a predetermined time threshold, various steps are performed. First, a predicted number of event participants is determined. Next, database artifacts associated with the upcoming virtual event are prefetched. Then static event display resources are accessed prior to a start of the upcoming virtual event, and the database artifacts and the static event display resources are cached. A network protocol request to access network resources is received from a client device. The database artifacts and the static event display resources are pushed to a client-side cache associated with the client device, and a minimal network response is transmitted to the client device.

20 Claims, 5 Drawing Sheets

(56) References Cited

OTHER PUBLICATIONS

Hong, Xuemin et al. "Cost Optimization for On-Demand Content Streaming in IoV Networks With Two Service Tiers." IEEE Internet of Things Journal 6: 38-49. (Year: 2019).*
Huang, Dan et al. "Pre-allocation based flash crowd mitigation algorithm for large-scale content delivery system." Peer-to-Peer Networking and Applications 8: 493-500. (Year: 2015).*
Symborski, C.. "Improving content download performance in online virtual worlds." Future Play. (Year: 2010).*
Ballantyne, Ian. "Optimal Asset Loading" Chapter 2 of "HTML5 Game Development Insights". Apress. (Year: 2014).*
Um, Tai-Won et al. "Dynamic Resource Allocation and Scheduling for Cloud-Based Virtual Content Delivery Networks." Etri Journal 36: 197-205. (Year: 2014).*

\* cited by examiner

MITIGATING NETWORK RESOURCE CONTENTION

TECHNICAL FIELD

Embodiments of the invention generally relate to mitigating network resource contention. More specifically, embodiments of the invention relate to various technologies for mitigating contention over network resources that multiple network clients may attempt to access simultaneously.

Virtual events, and associated speeches, such as keynote addresses tend to begin at a specified predetermined time, typically on the hour or half hour. Accordingly, depending on a number of attendees of a virtual event, a vast multitude of attendee client devices may substantially simultaneously make network resource requests, which can have the effect of overloading even adequately sized network resources. As such, what is needed are technologies for mitigating contention over network resources when multiple network clients attempt to access network resources substantially simultaneously.

SUMMARY

Embodiments of the invention address the above-identified need by providing techniques for mitigating contention over network resources that multiple network clients may attempt to access substantially simultaneously. In a first embodiment, the invention includes one or more non-transitory computer-readable media storing computer-executable instructions that, when executed by a processor, perform a method of mitigating network resource contention, the method comprising: receiving event scheduling details regarding one or more virtual events, in response to determining that an upcoming virtual event of the one or more virtual events will begin within a predetermined time threshold: determining a predicted number of event participants, prefetching database artifacts associated with the upcoming virtual event prior to a start of the upcoming virtual event, receiving static event display resources prior to a start of the upcoming virtual event, and caching the database artifacts and the static event display resources prior to a start of the upcoming virtual event, receiving, from a client device associated with an event participant, a network protocol request to access network resources associated with the upcoming event, pushing the database artifacts and the static event display resources to a client-side cache associated with the client device, prior to a start of the upcoming virtual event, and transmitting a minimal network response to the client device.

In a second embodiment, the invention includes a method of mitigating network resource contention, the method comprising: receiving event scheduling details regarding one or more virtual events, in response to determining that an upcoming virtual event of the one or more virtual events will begin within a predetermined time threshold: determining a predicted number of event participants, prefetching database artifacts associated with the upcoming virtual event prior to a start of the upcoming virtual event, receiving static event display resources prior to a start of the upcoming virtual event, and caching the database artifacts and the static event display resources prior to a start of the upcoming virtual event, receiving, from a client device associated with an event participant, a network protocol request to access network resources associated with the upcoming event, pushing the database artifacts and the static event display resources to a client-side cache associated with the client device, prior to a start of the upcoming virtual event, and transmitting a minimal network response to the client device.

In a third embodiment, the invention includes system comprising at least one processor and at least one non-transitory memory storing computer executable instructions that when executed by the processor cause the system to carry out actions comprising: receiving event scheduling details regarding one or more virtual events, in response to determining that an upcoming virtual event of the one or more virtual events will begin within a predetermined time threshold: determining a predicted number of event participants, prefetching database artifacts associated with the upcoming virtual event prior to a start of the upcoming virtual event, receiving static event display resources prior to a start of the upcoming virtual event, and caching the database artifacts and the static event display resources prior to a start of the upcoming virtual event, receiving, from a client device associated with an event participant, a network protocol request to access network resources associated with the upcoming event, pushing the database artifacts and the static event display resources to a client-side cache associated with the client device, prior to a start of the upcoming virtual event, and transmitting a minimal network response to the client device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
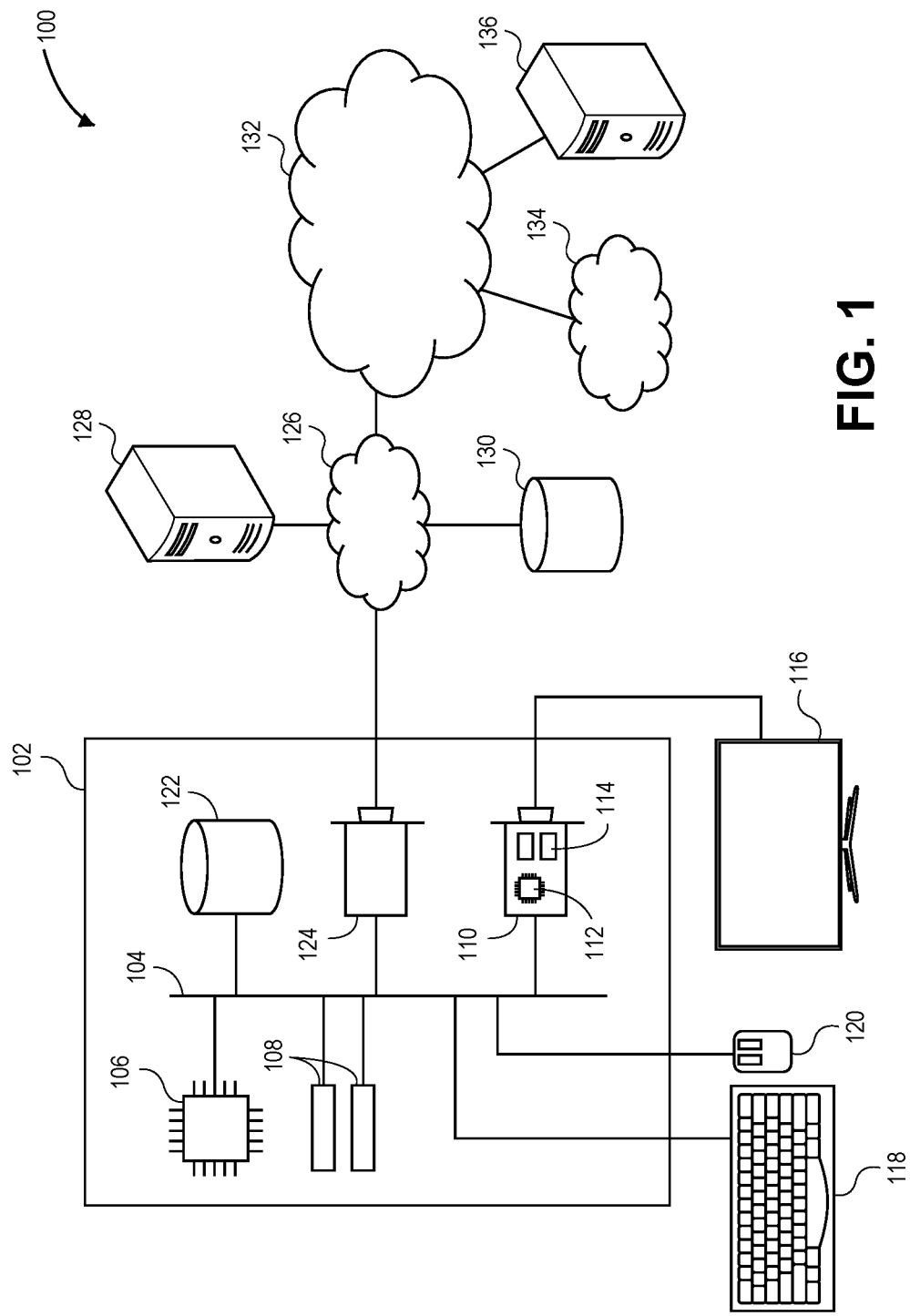
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "virtual event hosting platform" means an immersive, interactive online conference-hosting platform. Such platforms allow meeting participants to view presentations, participate in event sessions, network online, exchange virtual business cards, and engage in networking opportunities while preserving a record of connections made while attending a virtual event. A virtual event hosting platform may also enable hosting of in-person events as well as hybrid events that are hosted both in-person and virtually (online). A "virtual event hosting system" is an instantiation of a set of technical resources that provide for hosting of one or more virtual events in a virtual event hosting platform. For example, one virtual event hosting system may provide technical isolation from other virtual event hosting systems, as described in greater detail below, for the purposes of scalability and/or security, etc.

Virtual event hosting systems encounter predictable and unpredictable network resource contention challenges. Specifically, at the start of a virtual event, it is predictable that a significant percentage of attendees will connect to a virtual event hosting system at or around the time an event is set to begin. Moreover, certain other occurrences may be encountered mid-event that will cause attendees to place significant demands on network resources associated with a virtual event hosting system. In some embodiments attendee list management is an activity that concentrates requests on certain resources of a virtual event hosting system. For example, a virtual event hosting system may experience requests from attendee client devices at multiple times, for example, when a particular attendee performs any number of actions, such as: voting on a poll, submitting a comment to a presentation on a stage or session, or typing a chat message. Similarly, when any other attendee performs any of the above actions, data associated with such actions may potentially be pushed out to all other attendees, thereby causing a spike in demand for network resources associated with pushing out such data.

In various embodiments, multiple techniques are employed to mitigate excessive network resource contention associated with such demand spikes. A first technique involves caching information in browser memory associated with attendee client devices, or so-called front-end caching. Distributing client-side code that would cause each attendee client device to request all data associated with all attendees would likely prove infeasible for large-scale events. Such requests would overload the virtual event hosting systems and cause unacceptable interactive response times at attendee client devices. Accordingly in some embodiments, a technique is employed, in which an assumption is made that any time a user is encountered by an attendee client device, any associated information is cached at the attendee client device. Any time any such user information is needed again such information can be retrieved from a client-side cache, thereby avoiding a need to re-fetch such data from a backend of the virtual event hosting system. This approach relies on an assumption that some users are typically more active than other users and that once a user has taken an action that results in a need to distribute data regarding that action, the user is likely to take another such action over the course of a virtual event.

Another ameliorative technique involves delegation of a distributive push-out of data to a multitude of attendee client devices is to leverage third-party providers, as set forth in greater detail below, to provide such data to all attendees in a distributed fashion. Another spike protection technique involves scaling up available bandwidth and minimizing sizes of responses. In particular, in some embodiments, instead of providing a full response rendering a first event screen and implementing a full virtual event application, a basic placeholder response may be provided. In some embodiments, such a placeholder response may simply state "the event is about to begin, please wait" or to provide a user interface component that is generally understood by users to represent a loading or buffering pause, such as a so-called "throbber" or a "progress bar." In some embodiments, load balancing techniques are employed so that specific network requests may be distributed among various network resources. Additional backend and distributed caching techniques are described below as well, such as avoiding placing concurrent events being on the same virtual event hosting system in the same time slot.

In addition to client-side caching and load balancing, once a non-placeholder response is provided to a particular attendee client device, executable instructions may be provided to the attendee client device in connection with the non-placeholder response that cause the attendee client device to insert random delays for various attendees varying for example between zero and thirty seconds before making subsequent requests for data so as to spread out network requests across time periods and attendee client devices. Further techniques may be employed to distribute only data that is needed to render a particular display on a particular attendee client device.

Other client-side practices are employed to minimize an amount of data needed to distribute to various attendee client devices. For example, a fixed length of chat history may be cached on any particular attendee client device, so that scrolling backwards in chat history is limited to a predetermined number of past messages. To this end chat messages beyond the scroll-back limit flushed from a client-side cache, and the client-side user interface will not scroll back further, preventing a network request from being made for chat messages that are older than the last available chat message.

The subject matter of the invention is described in detail below to meet statutory requirements; however, the description itself is not intended to limit the scope of claims. Rather, the claimed subject matter may be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of non-transitory computer-readable media and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
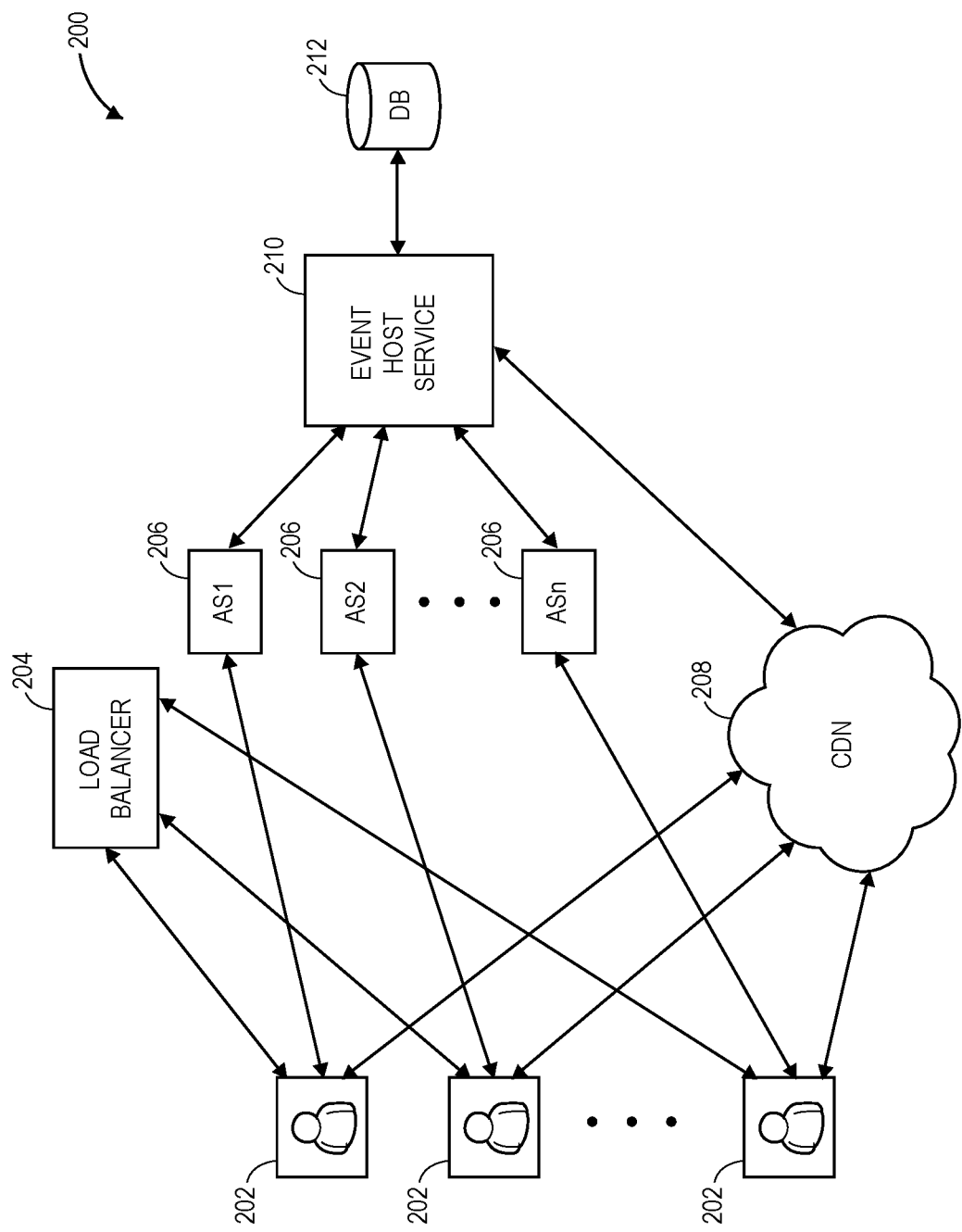
FIG. 2 illustrates elements of a system for carrying out embodiments of the invention.

FIG. 2 illustrates elements of a system 200 for carrying out embodiments of the invention. System 200 provides a platform for interacting with one or more virtual event hosting systems. System 200 includes any number of client devices such as virtual event hosting system client devices 202 (or client devices, used interchangeably hereinafter). Client devices 202 may be used by an attendee or a presenter (presenting user). As used herein a participant (or event participant) may be either an attendee or a presenter. Attendees may be persons who are merely attending the event in order to receive information and knowledge from the event, although such attendees may interact in the event by asking questions from presenters as well as engaging in networking opportunities or exchanging information with sponsors in an expo portion of the event. Attendees may also be sponsor-attendees, whose purpose in attending the event may be to promote products and services in connection with expo portions of the event as well as taking part in networking opportunities. In any case, participants may connect to components of system 200 using a single client device or multiple client devices, either concurrently or sequentially. Similarly, in some embodiments, multiple users may share (concurrently or sequentially) a single client device to access the virtual event hosting system, for example where a group of participants may participate in a video-conferencing enabled conference room. As depicted in FIG. 2, client devices may be any form of computing device discussed above with respect to FIG. 1. A user may access components of system 200 using a desktop computer, a laptop computer, or a mobile device. Components of system 200 may be accessible via dedicated software of a particular client device or via a web browser associated with the client device. In some embodiments, event organizers and virtual event hosting system administrators can access administrative functionality via any client device. In other embodiments, administrative functions can only be accessed from a limited subset of client devices.

In some embodiments, a virtual event hosting system provides functionality in connection with event host service 210. Event host service 210 may be a dedicated server, a shared server, a virtual machine instance in a cloud computing environment, or any other form of computing device discussed above with respect to FIG. 1. Event host service 210 may also be implemented in connection with containers (e.g., DOCKER-style containers) as provided by platformas-a-service (PaaS) technologies with virtualized host operating systems or with any number of serverless PaaS technologies.

Although a single event host service 210 is depicted, embodiments with multiple such services are also contemplated to provide scale, redundancy and/or isolation between different instances of the virtual event hosting system. For example, an event organizer hosting a private virtual event in which event participants register for the event under a non-disclosure agreement may not wish to have its confidential virtual event hosted on the same system as another event organizer's virtual event hosting system, for security reasons.

Moreover, a virtual event with thousands of participants may require multiple instances of event host service 210 for scaling purposes to provide sufficiently performant interactive response times that are adequate to provide an acceptable user experience. Yet further, a virtual event hosting system should be able to withstand an internal network partition or failure of computing resources. By providing multiple instances of event host service 210, optionally in various geographies, telecommunications infrastructure and/or hardware failure may result in a brief interruption (as a new event host service 210 takes over) rather than a complete outage, from a user's perspective.

Load balancer 204 represents a service for effectively distributing incoming requests to a group of back-end resources so that no individual system resource (or group of resources) becomes overloaded by sheer quantity of incoming requests. As depicted, load balancer 204 receives incoming requests from virtual event hosting system client devices 202. Once the client devices request access to certain network resources, load balancer 204 distributes corresponding requests to one or more of application services 206, denominated in FIG. 2 as AS1, AS2, to ASn. In some embodiments, server-side caching is provided in connection with application services 206. In these embodiments, resources that are requested by client devices 202 are cached in memory buffers associated with application services 206. In some such embodiments, when one of application services receives a request for a resource, a corresponding resource is cached in a plurality of application services 206. In some cases, the corresponding resource is cached in each of the application resources 206.

Load balancer 204 may employ any number of load-balancing strategies, including round-robin, weighted round-robin, least connection, weighted least connection, resource based, fixed weighting, weighted response time, or any combination thereof. Like event host service 210, load balancer 204 may be implemented as a physical hardware device or in connection with software as a service (SaaS), infrastructure as a service (IaaS) or PaaS, including serverless execution in a serverless execution environment. In some embodiments machine learning computations may be performed in connection with load balancer 204 including training of an associated load-balancing machine learning model. In some embodiments, the associated machine learning model may learn to apply a load-balancing strategy that, depending on a type of request, results in an optimal distribution of network and processing load across application services 206.

In some embodiments, media assets associated with a particular virtual event may be stored in one or more static content delivery networks (CDN) 208 in the cloud. CDN are geographically distributed networks of caching proxy servers in geographically distributed data centers. CDNs provide highly available and performant caching of media content by distributing corresponding media files and providing the media files geographically closer to requesting client devices. By using CDN 208, overall network bandwidth is conserved, performance is improved at client devices, and load is reduced at application services 206, as well as event host service 210 and database 212. Users of the virtual event hosting system are provided with geographically proximate, cached access to virtual event media assets, thereby improving the user experience and reducing load on the virtual event hosting system.

Application services 206 may be communicatively coupled to virtual event hosting system client devices 202 as well as load balancer 204 and CDN 208 via a network. Such a network may be a local area network (LAN), wide-area network (WAN), virtual private network (VPN) or the Internet. Broadly speaking, any type of network for providing communication between the various components of system 200 is contemplated. Either of application services 206 and/or event host service 210 may provide web server functionality to enable web-based clients and non-web server functionality to enable clients using a dedicated client-side application. Alternatively, both web-based clients and dedicated client-side application clients may both use a single web server, or the web server may be a gateway providing web-based access to a dedicated client-side application service. Other techniques for enabling communication among various types of client applications are also contemplated.

Database 212 is communicatively connected to event host service 210. As depicted, database 212 is directly connected to event host service 210; however, any form of communicative connection (for example, network-attached storage (NAS), a network file system (NFS), or cloud-based storage) can be employed. Broadly speaking, database 212 stores structured data regarding a particular virtual event, used by event host service 210. For example, database 212 may store virtual event user participation information, such as lists of participating users and information regarding user participation. User participation includes voting on a poll or typing a message in a chat session. In a large event, database 212 may contain up-to-date information regarding participation of many thousands of users.

In order to mitigate resource contention at database 212, various backend caching techniques may be employed. In some embodiments, database 212 is hosted in connection with a database server that itself employs server-side caching for frequently or recently accessed data. Such server-side event history caching may involve use of a first-in-first-out (FIFO) buffer or a circular buffer of a fixed size to allow queries regarding event history without executing a database operation. Alternatively, server-side caching using a fixed size cache may utilize least-recently used (LRU) eviction. In other embodiments, a cache of dynamic or otherwise non-fixed size may be employed. In some embodiments, each access to a backend (or, in some embodiments, a client-side) cache may have a particular probability of invalidating the accessed cache entry, such that the value is accessed from the database (or other definitive source) and re-cached. In some embodiments, this probability may be based on the time since the value was cached, such that (for example) older cache entries are more likely to be refreshed. Such probabilistic caching allows for more commonly accessed resources to be updated more frequently. In some other embodiments, queries have a probability to extend the life of cached resources. In these embodiments, queried resources that are present in a cache are given an extended time to live, i.e., in LRU mode, queried resources are "touched," meaning they are pushed back in a queue to be expired from the cache.

However, in some situations (such as the start of an event), many thousands or millions of requests may be received for a resource in a short time interval, potentially causing a large number of database accesses associated with refreshing the cache. In some embodiments, if such a traffic spike is detected (or anticipated), probabilistic cache validation may be temporarily disabled. For example, in some such embodiments, the cache is updated in advance of an anticipated spike and then probabilistic caching is disabled. In other embodiments, such as those where a probability of cache invalidation is proportional to the time since the value was last cached, resources anticipated to be requested during a spike may be refreshed immediately in advance of an anticipated spike, such that the probability of a request for the resource in the upcoming spike is very low. Such variation of probabilistic caching allows for preemptive traffic management with smaller caches and less-frequent updates.

In some embodiments, such caching of a certain amount of historical event data may also be pushed out to application services 206. In these embodiments, when any one of application services 206 queries database 212 for historical information, such information is provided to each of application services 202. In some other embodiments, when a new piece of event-related data is written to database 212, such a piece of event-related data (e.g., a chat message) is pushed out to each of application services 206 under the expectation that this piece of event-related data will be required by many client devices 202 and by pushing out the corresponding pieces of event-related data, rapid fire queries against database 212 may be prevented, thereby preventing overloading database 212. In some such embodiments, one or more FIFO buffers or other variable or fixed-sized circular buffers are employed in connection with application services 206 so that a predetermined number of historical pieces of information are cached in the backend in connection with application services 206.

As previously described, multiple virtual event hosting systems may be present in system 200. In such embodiments, each of the virtual event hosting systems may have its own database 212. Alternatively, multiple virtual event hosting systems may share a single network-attached database. Alternatively, or in addition, in any of these embodiments, data may be sharded across multiple databases.

In some embodiments, upon initialization of a connection between a client device and a virtual event hosting system, a bidirectional network connection is established between the client device and a component of the virtual event hosting system. In some such embodiments the bidirectional network connection is formed as a web socket connection. In these embodiments, the web socket connections are established between virtual event hosting system client devices 202 and one or more instances of application service 206. From a networking perspective, such a web socket service may be managed independently from the virtual event hosting system. In these embodiments, event host service 210 sends one or more real-time messages to the web socket service, and such real-time messages are then distributed to all connected client devices, thereby obviating any need for connected client devices to poll for new messages from the virtual event hosting system. In one example, a chat message is received for an event chat at event host service 210. Potentially, all virtual event participants could have a need to be provided access to this received chat message. In this example, the message is sent from the virtual event hosting system to a web socket service associated with the particular virtual event, identified (for example) by a virtual event identifier. The real-time message associated with the chat message is then distributed to each of application services 206 with client devices associated with participants attending the corresponding virtual event (as identified by the virtual event identifier). Thereafter, application services 206 distribute corresponding real-time messages to the individual client devices. Using such an independent web socket service has the benefit of offloading from the virtual event hosting system the overhead of establishing, maintaining, and terminating network connections underlying the web socket connections. It is understood that other distributed publish/subscribe network communication protocols can be employed without departing from the scope of the claimed invention.

In some embodiments, such web socket connections may be established prior to the start of a virtual event, in connection with a pre-event application experience also known as a "waiting room," as further described in connection with FIG. 4 below. Overhead associated with establishment of a web socket connection need only be performed at the initiation of the web socket connection and when the connection is lost, which in the absence of significant physical layer network disruptions would typically be rare. Additionally, in cases where an independent web socket service is employed, any overhead associated with initiating and maintaining web socket connections is offloaded to the independent web socket service provider.

Figure 3:
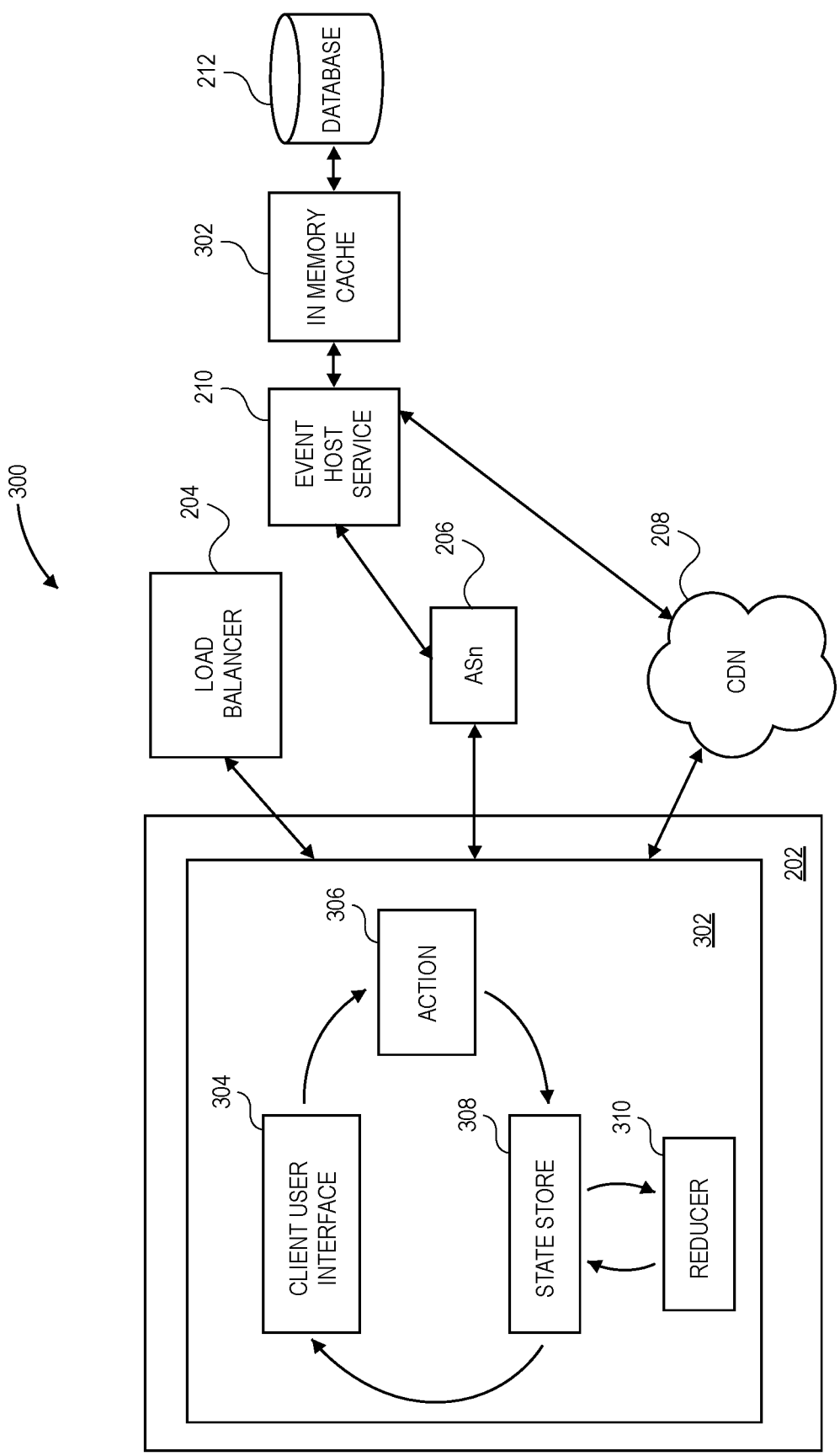
FIG. 3 depicts system in which a representative client-side cache structure operates in connection with certain embodiments of the invention.

FIG. 3 depicts a system 300 in which a representative client-side cache structure operates in connection with certain embodiments of the invention. In some embodiments, a virtual event client application is implemented as an application that executes within a web browser rendering engine in connection with a script-based runtime library. In some such embodiments, the client application is implemented in connection with a template-based script library for building user interfaces. In some embodiments, templates, code, and markup (including style sheets) are transmitted from a virtual event hosting system to the web browser rendering engine. In these embodiments, the application is executed in a web browser that implements a browser application framework. In other embodiments, the application is executed in a native application built in connection with a software framework that employs a web browser content rendering engine that implements the browser application framework. In some such alternative embodiments, the application may be a native mobile application or a native desktop application. In some embodiments, native applications are built in connection with a cross-platform application development platform that employs a browser rendering engine that can execute in connection with a template-based script library for building user interfaces. In other embodiments, native applications are developed according to platform-specific application frameworks to leverage platform-specific features in an optimized manner.

In some embodiments, a plurality of sets of processes and resources associated with a browser application framework implement a virtual event hosting system client interface. In one embodiment, a single process 302 implements a virtual event hosting system client interface. In this embodiment, the client user interface is rendered in connection with a user interface window as depicted in FIG. 4, described below. In rendering client user interface 304, process 302 receives real-time messages from message sources such as from a virtual event hosting system. Other real-time messages include user interactions such as keystroke inputs, mouse movements, mouse clicks, or mobile user interface gestures such as taps or multi-touch gestures.

Any such real-time message received at client user interface 304 that needs to be processed within process 302 may be processed in connection with one or more actions such as action 306. In some embodiments, action 306 is an object having a type attribute and a payload attribute. In this embodiment, the type attribute contains a designation of the type of incoming real-time message described above that corresponds to the action, such as the type of real-time message received from a virtual event hosting system. Similarly, the payload attribute corresponds to specific content associated with the real-time message such as the content associated with the real-time message, which could correspond to a message having been received in a virtual event hosting system chat and/or poll, for example.

In this embodiment, the action causes state store 308 associated with process 302 to be updated. In some embodiments, state store 308 is updated in connection with one or more reducers such as reducer 310. In some embodiments, reducer 310 is a function that receives a current state of state store 308 and an action 306 and based on a type associated with the type attribute of action 306 immutably updates the state of state store 308. In this embodiment, reducer 310 is a real-time message handler for a particular action type corresponding to action 306.

Within process 302, when portions of state store 308 are added or otherwise modified, corresponding changes are reflected in client user interface 304. In some embodiments, components associated with client user interface 304 subscribe to types of data within state store 308 so that any changes occurring to such a subscription will cause selective refreshing of client user interface 304. In some other embodiments, any change to state store 308 causes a refresh to any visible portions of client user interface 304. In some other embodiments, client user interface 304 is periodically completely refreshed if any change has occurred within state store 308.

In some embodiments, a multitude of event hosting system components and associated virtual event hosting system objects (such as event users) are accumulated in state store 308. In some embodiments, an unlimited number of virtual event hosting systems, poll answers, chat messages, users, and other virtual event hosting system objects are permitted to accumulate in state store 308, whether or not the virtual event hosting objects are currently displayed in connection with the virtual event hosting system client interface. Storing all virtual event hosting system objects in state store 308 has the benefit of being able to quickly facilitate responding to an arbitrary request to display a virtual event hosting system object at a virtual event hosting system client interface.

In some embodiments, a virtual event hosting user is able to scroll backwards to access a predetermined number of previous chat messages. In these embodiments, messages occurring earlier in time than a predetermined number of previous chat messages previously may be purged from the client-side cache. Additionally, contents associated with real-time messages corresponding to virtual event hosting objects that are not currently being displayed may not be stored in the client-side cache. In some other embodiments, contents associated with real-time messages corresponding to virtual event hosting objects that are not currently being displayed, but which are predicted to be displayed in the near future, may be stored in the client-side cache.

In some embodiments any event participant that has participated in a virtual event or is predicted to be active will be stored in the client-side cache along with information regarding details of the participant's participation. In some embodiments, upon initial loading of a virtual event, data regarding participants having the most important roles (i.e., event organizers, speakers, and/or panelists) are pushed out to clients to be stored in a client-side cache. In these embodiments, as a virtual event hosting system user navigates a virtual event, other virtual event participants having roles of particular significance are cached as they are encountered over the course of navigating the virtual event (i.e., session moderators, sponsor moderators, and/or sponsor expo attendees). In some such embodiments, other participants may also be cached on the basis of activity. In these embodiments, the most active participants are the participants deemed most likely to engage in participation activities, producing additional real-time messages to be cached. In some such embodiments, where a participant is encountered once, it is assumed that the participant will engage in subsequent participation activities. Accordingly, in these embodiments, data regarding frequently participating participants are preserved in a client-side cache for a predetermined time period. When a subsequent participation activity occurs, the timer is reset. In some such embodiments, if a formerly participating user does not participate for the predetermined period of time, the cached information regarding the formerly participating participant will be purged from cache.

It is beneficial to store as much data as practicable regarding participants in state store 308. As new virtual event hosting system objects (poll answers, chat messages) are created in the virtual event hosting system, such new objects can advantageously be sent, for example, by way of real-time occurrence messages to the virtual event hosting system client and stored in state store 308 (optionally distributed by way of web socket providers as described above in connection with FIG. 2). When any change is made in the virtual event hosting system backend, such as if a new poll answer is received or a new chat message sent, it is advantageous for a real-time message to be sent to the virtual event hosting system client application so that state store 308 may be correspondingly updated. The benefit of having as much virtual event hosting system content as practicable in state store 308 is that regardless of what a user wants to access by scrolling backward or forward or searching for any virtual event hosting system object that the user has access to, such content will be in state store 308 (cached locally) and the user interface can provide performant access to the content without resorting to querying the virtual event hosting system for such information. In some embodiments, executable instructions provided to the client device prevent querying the virtual event hosting system for historical information that is older than a predetermined number of items to reduce load on the virtual event hosting system.

As noted in connection with FIG. 2 above, load balancer 204 may be employed to distribute load from client devices 202 to various application services 206. In some such embodiments, load balancer 204 receives a request for updated information regarding a virtual event, and load balancer 204 makes a determination regarding which application service in application services 206 to instruct client device 202 to interact with. In some such embodiments, load balancer 204 makes the determination on the basis of prior assignments to various of the application services 206. In some other embodiments load balancer 204 establishes a communications channel (not shown) with each of the application services 206 to determine which of the application services 206 has the best availability to respond to client device 202. In some embodiments, application services 206 are partitioned into subject-matter-specific caching application services, such that a group of application services 206 specialize in caching information regarding specific chat sessions, and some cache information regarding break-out sessions, etc. In some embodiments, load balancer 204 makes this determination based on specifics of a particular request made by client device 202. In some other embodiments, load balancer 204 maintains a list of client devices 202 and tracks the nature of previous requests from a particular client device. In these embodiments, load balancer 204 will direct the particular client device to an application service that is caching the type of information that the client device most recently requested. In the event that a client device requests information that is cached in a particular application service instance, the request will be more quickly responded to than if the requested information is not in the particular cache. However, even in the case of such a cache miss, responsive data may be obtained by way of the application service requesting the information from event host service 210.

In some embodiments, event host service processes real time or near real time event-related information as such event-related information is received from event participants. In some such embodiments, once event-related information is processed it may be pushed out to various application services 206 such that attendees who are connected to a particular application service can access updated event-related information without making a request that triggers resource contention (such as a database query against database 212). In these embodiments, where an attendee is viewing a virtual event in essentially a read-only fashion, i.e., not sending chat messages an attendee can receive up-to-date information regarding a virtual event without increasing backend resource contention. Similarly, for certain types of static content, such as images or other types of multimedia, event host service 210 can push content to CDN 208, which may be hosted by a third-party, such that client devices 202 can access such content in a geographically convenient and performant manner without placing any extra load on backend systems of the virtual event hosting system.

In some embodiments, a separate caching system may be implemented between event host service 210 and database 212. In some such embodiments in-memory cache 302 is a caching service that may run on a database server hosting database 212. In some other embodiments, in-memory cache 302 may be implemented as a separate service that intelligently caches certain pieces of information from database 212 that are expected to be widely needed by event participants and unlikely to have changed in database 212. Such in-memory caching may involve use of a FIFO buffer or a circular buffer to allow queries regarding event history from event host service 210, without executing a database operation. In these embodiments, when any one of application services 206 makes a request from event host service 210 for historical information, such information may be cached at in-memory cache 302. In some other embodiments, when a new piece of event-related data is written to database 212, such a piece of event-related data (e.g., a chat message) may be pushed out to in-memory cache 302 under the expectation that this piece of event-related data may be required multiple times by client devices 202 and/or event host service 210 and by caching such data at in-memory cache 302 redundant queries against database 212 may be prevented, thereby preventing overloading database 212.

Figure 4:
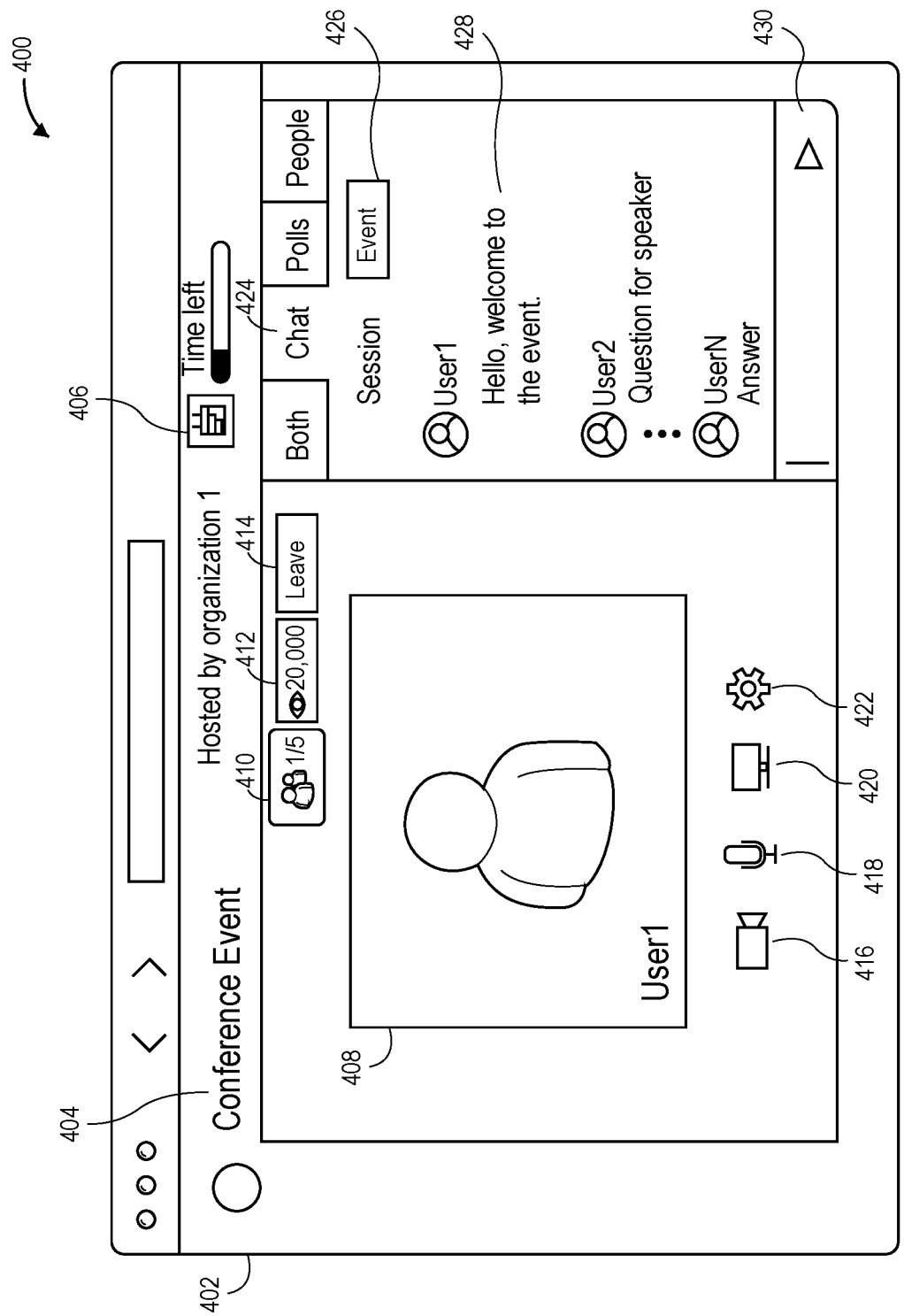
FIG. 4 depicts a representative user interface for certain embodiments of the invention.

FIG. 4 depicts a graphical user interface 400 including an exemplary event user interface 402. In some embodiments, the event user interface 402 may be generated for display within a graphical user interface on any of the client devices 202 of virtual event presenting users or other virtual event attendees. In some embodiments, a similar event user interface 402 may be displayed to each of the presenting users as well as the attendees. Alternatively, in some embodiments, the event user interface 402 may appear differently for different types of participants. For example, presenting users may have the option to enable/disable their microphone using the event user interface 402 while the attendees may not have this option. Further, embodiments are contemplated in which an attendee may present video by enabling either of the user's microphone or camera from within event user interface 402. In some embodiments control of camera and microphone may be affected in connection with camera control 416 and/or microphone control 418.

In some embodiments, virtual event user interface 402 may be desirable to provide a few-to-many communications environment, for example, allowing one participant or a handful of participants to give a speech or discuss a topic before thousands of attendees. In one example, up to one hundred thousand viewing attendees may consume multimedia resources associated with a virtual event. Alternatively, in some embodiments, a greater or lesser number of users may participate.

In some embodiments, the graphical user interface 400 includes an event title 404 for the event and schedule interface object 406. In some embodiments, schedule interface object 406 provides a link to a user interface component that provides lists of sessions and when the sessions occur. In some embodiments, the schedule interface object 406 may be selected to access an event schedule for the event which may be predefined for the event and may be updated during the event. Additionally, in some embodiments, the schedule interface object 406 includes an indication of the time remaining for the session, as shown. In some other embodiments, an indication of the time remaining in the overall event. For example, the indication of time remaining may show the progress of the event with respect to the total event time. The indication may appear as a progress bar, as shown, but may alternatively or additionally include the time remaining as an hour and minute value or as a percentage of the total time for the event.

In some embodiments, a video window 408 may be displayed on the event user interface 402, as shown, based on a received video stream for a respective presenter. In some embodiments, video window 408 may be a video stream corresponding to a keynote address, for example. Accordingly, video window 408 may show video data captured by the keynote speaker's camera. In some embodiments, video window 408 may provide options for reset, broadcast, leave, and other video-streaming-related options. In some embodiments, a reset button may be provided to reset the stage presentation when a stage is broken such as, for example, if the presentation is frozen or if a network signal is weak or is lost.

In some embodiments, a broadcast/stop broadcast button may be selected to share or stop sharing the user video taken from the user camera. In some embodiments, any participant may select the broadcast/stop broadcast button to present video during the stage event. Furthermore, leave button 414 may be presented to allow the user to leave the stage. In these embodiments, when leave button 414 is selected, the user may leave the stage and be routed back to the landing page or another page presenting stage options for entry.

Additionally, included are one or more indicator objects, such as presenting users indicator 410 indicating a number of active presenters and a viewing users' indicator 412 indicating a number of viewers watching the video stream in a particular virtual event session. In some embodiments, a leave button 414 may be included, which may exit the event or the current video session in response to user actuation. As such, embodiments are contemplated where the leave button 414 may be used, for example, to leave a meeting, end a video stream, or disconnect from a video stream. Additionally, included on the graphical user interface 400 are camera control 416, microphone control 418, share screen control 420, and settings control 422. In some embodiments, camera control 416 and microphone control 418 may be used to toggle activation of the participant's camera and microphone respectively. Accordingly, a participant may selectively actuate camera control 416 to start or stop sharing the participant's video data and selectively actuate microphone control 418 to optionally enable or mute the participant's microphone.

Share screen control 420 may be selected to share the participant's screen. For example, embodiments are contemplated in which share screen control 420 switches the video data that is shared from the camera video data to the user's screen. Accordingly, the user may be able to share live video footage of the user's computer screen or a screen from another user device with the other presenting users and viewing users. Further, embodiments are contemplated in which the participant may simultaneously share the participant's screen and video data from the participant's camera. Further still, in some embodiments, share screen control 420, when selected, presents the participant with options for selecting which specific screen or window to share, for example, where the participant has multiple screens and application windows open at once.

Settings control 422, when selected, may present the participant with a set of options to change various settings associated with the event, the video streaming service, and graphical user interface 400. For example, in some embodiments, settings control 422 allows the participant to adjust various settings such as, switching the active input devices and output devices for audio and video, change microphone monitoring settings, change output volume, adjust video quality, and other related settings.

In some embodiments, graphical user interface 400 further includes one or more selectable tabs 424, such as, for example, a booth tab, a chat tab, a polls tab, and a people tab, as shown. Here, the booth tab may be used to provide a plurality of virtual booths allowing individuals or organizations to present relevant event information. In some embodiments, the chat tab may be used to provide a messaging environment for various users, as will be described in further detail below. The polls tab may provide a way for participants to provide answers to polling questions. For example, a presenting user may present a polling question such that attendees may access the polls tab to provide answers to various polls. Results of the polls may be forwarded to a participant user or may be available to all viewing users after a polling time has expired or once every user has answered a particular polling question. In some embodiments, polls can be targeted to either keynote attendees (using the sessions tab) or all users in the event (using the event tab). In some such embodiments, private sessions may be created to target a poll to an arbitrary segment of attendees. Such a private session may have any number of users, or such a private session may be targeted to a smaller subset of the arbitrary segment of users, including a single user. The people tab may be selected to present information about the people in the event or in a specific session. In some embodiments, the people tab may include biographical information and/or contact information for each virtual event participant.

In some embodiments, graphical user interface 400 may further include a viewing option interface object 426, which may be used to select the viewing option that is displayed in the graphical user interface 400. For example, an attendee may select between an event option and a session option, as will be described in further detail below. In some embodiments, the event option may be selected to view a main stage of an event and the session option may be selected to view a breakout session of the event.

In some embodiments, chat messaging window 428 may be included allowing chat users to communicate via textual messages or multimedia messages. Accordingly, chat messaging window 428 may present a plurality of user messages from various participants. Embodiments are contemplated in which both presenters and attendees are able to interact within chat messaging window 428. Alternatively, in some embodiments, chat messaging window 428 may be restricted to presenting users or to other specific participants. Additionally, a message input interface object 430 may be included allowing a particular user to compose and send a chat message to be posted in the messaging window visible to other users. In some embodiments, the messages may include any of textual communications or file attachments, reactions, emojis, and other types of message communications. In order to facilitate pushing out chat messages to a multitude of client devices associated with a large number of attendees, for example, both the client-side and server-side caching techniques of the present teachings may be employed. These caching techniques prevent resource contention bursts associated with the need to update updating chat messaging window 428 at the multitude of client devices that need to receive new or updated chat interface information.

Figure 5:
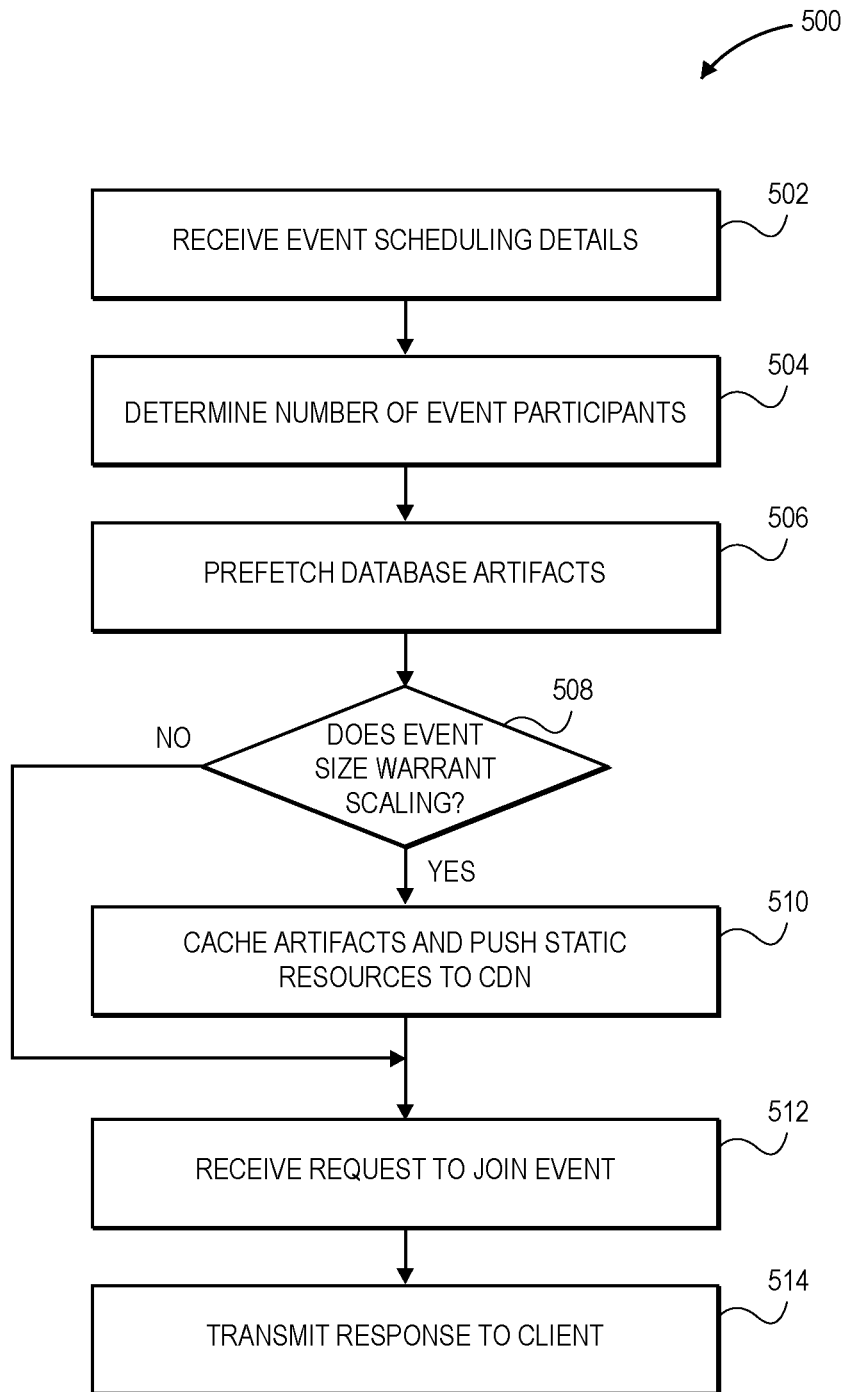
FIG. 5 depicts a flowchart illustrating the operation of a method in accordance with embodiments of the invention.

FIG. 5 depicts a flowchart 500 illustrating the operation of a method for mitigating network resource contention in accordance with embodiments of the invention. At step 502, event scheduling details are received regarding one or more virtual events. In some embodiments, the event scheduling details include information regarding the virtual event organizer, length of the event, a number of sessions, a number of registered attendees, and (optionally) which tracks and/or sessions each registered attendee has expressed an interest in joining or otherwise participating in. In some embodiments, the received event scheduling details may be used to pre-configure or update the configuration of various components of a virtual event hosting platform. For example, based on a known number of registered attendees, a corresponding number of application service instances may be provisioned. In such an example, a predetermined number of application service instances may be initially provisioned based on an expectation that a certain number of registered attendees will initially connect, and as additional registered attendees join, additional application service instances may be provisioned. Similarly, as event participants begin to log off at the end of an event, numbers of application service instances may be terminated so as to reduce resource consumption and associated expenses.

In addition to scaling up or down numbers of application service instances, information received regarding scheduling details can help inform adaptation of other aspects of the virtual event hosting platform. For example, to the extent a number of sessions are known and, optionally, a number of attendees in particular tracks or sessions, resources and caching strategies may be adopted to direct resources to areas where such resources will be needed by client devices. For example, if a particular session has a large number of attendees, a load balancer may be configured to direct users participating in those sessions to application service instances that are caching data regarding those particular sessions. In some such embodiments, groups of application service instances may be partitioned to cache event information regarding particular sessions that particular attendees have expressed interest in joining.

At step 504, in response to determining that an upcoming virtual event of the one or more virtual events will begin within a predetermined time threshold, a predicted number of event participants is determined. In some embodiments, the predicted number of event participants may be determined based on past experience with similar events, For example, for some types of events, substantially all registered participants will join. For other types of events, a significant portion of event participants may either not join the event at all or may join only after the virtual event has started. Such a prediction may be useful in predicting the amount of network resource load that will be generated at the beginning of a particular virtual event when users connect en masse to the virtual event.

At step 506, database artifacts associated with the upcoming virtual event are prefetched prior to a start of the upcoming virtual event. In some embodiments, static event display resources are received prior to a start of the upcoming virtual event. In some embodiments, in response to identifying distributable static event display resources that may be distributed to one or more content delivery networks, the distributable static event display resources are distributed to content delivery network servers associated with the one or more content delivery networks. In these embodiments, links associated with the static event display resources are dynamically updated to updated resource locators associated with the distributed static event display resources.

At optional test 508, it is determined whether a virtual event size, i.e., number of virtual event participants warrants scaling the virtual event. In various embodiments, virtual events that have under 100 participants may not require the substantial overhead in terms of scaling that an event with thousands of participants may require. In some embodiments, the database artifacts and the static event display assets are cached prior to a start of the upcoming virtual event. In some such embodiments, the caching process proceeds as the virtual event proceeds. In some embodiments, static event display assets are cached at the client-side when the static event display assets are first requested by a particular client device. In these embodiments, client-side logic enables pushing out of the static event display assets before the event starts, thereby minimizing event-start-time network resource request spikes. In some embodiments, the virtual event hosting system may predict that when first encountering a request at the beginning of a virtual event, that such a request may be followed shortly thereafter by a rapid fire of similar requests by other virtual event participants. Accordingly, in addition to client-side caching, a server caches the response in a short-lived cache. In some embodiments, this short-lived cache is implemented as in-memory database, such as REDIS, for caching, and use a distributed in-memory database cluster with copied versions to distribute the load, for example delegating functionality to a third-party in-memory database cloud provider, such as REDISCLOUD, or alternatively, on an AWS's ELASTICACHE from AMAZON. In some embodiments, the pushed database artifacts comprise a set of event participant metadata associated with a list of event participants participating in the virtual event. In some embodiments, the event scheduling details comprise an event participant group identifier associated with one or more event participant statuses. In some embodiments, the one or more event participant statuses comprise a priority status corresponding to an event participant that receives priority access to aspects of the virtual event.

At step 512, a network protocol request is received, from a client device associated with an event participant, to access network resources associated with the upcoming event. In some embodiments, the database artifacts and the static event display resources are pushed to a client-side cache associated with the client device, prior to a start of the upcoming virtual event.

Finally at step 514, a minimal network response is transmitted to the client device. In some embodiments, the minimal response comprises computer executable instructions for establishing a web socket connection from a virtual event hosting server to the client device. In some embodiments, the minimal network response comprises configuration parameters including an event participant group identifier and an associated client-side delay based on the event participant group identifier.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media storing computer-executable instructions that, when executed by a processor, perform a method of mitigating network resource contention, the method comprising:
receiving event scheduling details regarding one or more virtual events;
in response to determining that an upcoming virtual event of the one or more virtual events will begin within a predetermined time threshold:
determining a predicted number of event participants;
prefetching database artifacts associated with the upcoming virtual event prior to a start of the upcoming virtual event;
receiving static event display resources prior to a start of the upcoming virtual event; and
caching the database artifacts and the static event display resources prior to a start of the upcoming virtual event;
receiving, from a client device associated with an event participant, a network protocol request to access network resources associated with the upcoming event;

pushing the database artifacts and the static event display resources to a client-side cache associated with the client device, prior to a start of the upcoming virtual event; and transmitting a minimal network response to the client device.

2. The one or more non-transitory computer-readable media of claim 1, wherein the method further comprises:

in response to identifying distributable static event display resources that may be distributed to one or more content delivery networks;

distributing the distributable static event display resources to content delivery network servers associated with the one or more content delivery networks; and dynamically updating links associated with the static event display resources to updated resource locators associated with the distributed static event display resources.

3. The non-transitory computer-readable media of claim 1, wherein the minimal network response further comprises:

computer executable instructions for establishing a web socket connection from a virtual event hosting server to the client device.

4. The non-transitory computer-readable media of claim 3, wherein the minimal network response comprises an event participant group identifier and an associated client-side delay based on the event participant group identifier.

5. The non-transitory computer-readable media of claim 1, wherein the pushed database artifacts comprise a set of event participant metadata associated with a list of event participants participating in the virtual event.

6. The non-transitory computer-readable media of claim 1, wherein the event scheduling details comprise an event participant group identifier associated with one or more event participant statuses.

7. The non-transitory computer-readable media of claim 6, wherein the one or more event participant statuses comprise a priority status corresponding to an event participant that receives priority access to aspects of the virtual event.

8. A method of mitigating network resource contention, the method comprising:

receiving event scheduling details regarding one or more virtual events;

in response to determining that an upcoming virtual event of the one or more virtual events will begin within a predetermined time threshold:

determining a predicted number of event participants;

prefetching database artifacts associated with the upcoming virtual event prior to a start of the upcoming virtual event;

receiving static event display resources prior to a start of the upcoming virtual event; and caching the database artifacts and the static event display resources prior to a start of the upcoming virtual event;

receiving, from a client device associated with an event participant, a network protocol request to access network resources associated with the upcoming event;

pushing the database artifacts and the static event display resources to a client-side cache associated with the client device, prior to a start of the upcoming virtual event; and transmitting a minimal network response to the client device.

9. The method of claim 8, wherein the method further comprises:

in response to identifying distributable static event display resources that may be distributed to one or more content delivery networks;

distributing the distributable static event display resources to content delivery network servers associated with the one or more content delivery networks; and dynamically updating links associated with the static event display resources to updated resource locators associated with the distributed static event display resources.

10. The method of claim 8, wherein the minimal network response further comprises:

configuration parameters for establishing a web socket connection from a virtual event hosting server to the client device.

11. The method of claim 10, wherein the minimal network response comprises an event participant group identifier and an associated client-side delay based on the event participant group identifier.

12. The method of claim 8, wherein the pushed database artifacts comprise a set of event participant metadata associated with a list of event participants participating in the virtual event.

13. The method of claim 8, wherein the event scheduling details comprise an event participant group identifier associated with one or more event participant statuses.

14. The method of claim 13, wherein the one or more event participant statuses comprise a priority status corresponding to an event participant that receives priority access to aspects of the virtual event.

15. A system comprising at least one processor and at least one non-transitory memory storing computer executable instructions that when executed by the processor cause the system to carry out actions comprising:

receiving event scheduling details regarding one or more virtual events;

in response to determining that an upcoming virtual event of the one or more virtual events will begin within a predetermined time threshold:

determining a predicted number of event participants;

prefetching database artifacts associated with the upcoming virtual event prior to a start of the upcoming virtual event;

receiving static event display resources prior to a start of the upcoming virtual event; and caching the database artifacts and the static event display resources prior to a start of the upcoming virtual event;

receiving, from a client device associated with an event participant, a network protocol request to access network resources associated with the upcoming event;

pushing the database artifacts and the static event display resources to a client-side cache associated with the client device, prior to a start of the upcoming virtual event; and transmitting a minimal network response to the client device.

16. The system of claim 15, wherein the actions further comprise:

in response to identifying distributable static event display resources that may be distributed to one or more content delivery networks;

distributing the distributable static event display resources to content delivery network servers associated with the one or more content delivery networks; and dynamically updating links associated with the static event display resources to updated resource locators associated with the distributed static event display resources.

17. The system of claim 15, wherein the minimal network response further comprises:
   details for establishing a web socket connection from a virtual event hosting server to the client device.

18. The system of claim 17, wherein the minimal network response comprises an event participant group identifier and an associated client-side delay based on the event participant group identifier.

19. The system of claim 15, wherein the event scheduling details comprise an event participant group identifier associated with one or more event participant statuses.

20. The system of claim 19, wherein the one or more event participant statuses comprise a priority status corresponding to an event participant that receives priority access to aspects of the virtual event.

* * * * *